(12) United States Patent
Yin

(10) Patent No.: US 11,379,845 B2
(45) Date of Patent: Jul. 5, 2022

(54) METHOD AND DEVICE FOR IDENTIFYING A RISK MERCHANT

(71) Applicant: ADVANCED NEW TECHNOLOGIES CO., LTD., Grand Cayman (KY)

(72) Inventor: Xiaohua Yin, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 17/348,953

(22) Filed: Jun. 16, 2021

(65) Prior Publication Data

US 2021/0312460 A1    Oct. 7, 2021

Related U.S. Application Data

(63) Continuation of application No. PCT/CN2020/070672, filed on Jan. 7, 2020.

(30) Foreign Application Priority Data

Mar. 14, 2019 (CN) .......................... 201910192832.0

(51) Int. Cl.
  *G06Q 20/40* (2012.01)
  *G06K 9/00* (2022.01)
  *G06K 9/62* (2022.01)

(52) U.S. Cl.
  CPC ....... *G06Q 20/4016* (2013.01); *G06K 9/6215* (2013.01); *G06K 9/6218* (2013.01)

(58) Field of Classification Search
  None
  See application file for complete search history.

(56) References Cited

U.S. PATENT DOCUMENTS

| 7,376,618 B1 * | 5/2008 | Anderson | ............. G06Q 20/10 705/38 |
| 8,386,377 B1 | 2/2013 | Xiong et al. | |

(Continued)

FOREIGN PATENT DOCUMENTS

| CN | 105159879 A | 12/2015 |
| CN | 105608179 A | 5/2016 |

(Continued)

OTHER PUBLICATIONS

Supplementary Search for Chinese Application No. 201910192832.0 dated Sep. 24, 2021.

(Continued)

*Primary Examiner* — Matthew C Bella
*Assistant Examiner* — Brian D Shin

(57) ABSTRACT

A method for identifying a risk merchant comprises: determining, for each of at least one marked merchant cluster based on a user correlation degree of a merchant to be identified and the each marked merchant cluster, a degree of similarity between the merchant to be identified and the marked merchant cluster, wherein each marked merchant in the each marked merchant cluster is marked with a corresponding risk category by a trained classification model, and the user correlation degree of the merchant to be identified and the marked merchant cluster comprises a user correlation coefficient of the merchant to be identified and the marked merchant cluster and a number of same users of the merchant to be identified and the marked merchant cluster; and determining whether the merchant to be identified is a risk merchant based on the degree of similarity between the merchant to be identified and the each marked merchant cluster.

20 Claims, 6 Drawing Sheets

---

Determining, for each of at least one marked merchant cluster, a degree of similarity between a merchant to be identified and the each marked merchant cluster

S120

↓

Determining whether the merchant to be identified is a risk merchant based on the degree of similarity between the merchant to be identified and the each marked merchant cluster

S140

(56) References Cited

U.S. PATENT DOCUMENTS

| | | | |
|---|---|---|---|
| 8,554,653 | B2 | 10/2013 | Falkenborg et al. |
| 9,799,078 | B2 | 10/2017 | Winters |
| 9,818,116 | B2 | 11/2017 | Caldera |
| 9,888,007 | B2 | 2/2018 | Caldera et al. |
| 10,089,630 | B2 | 10/2018 | Clyne |
| 10,115,153 | B2 | 10/2018 | Zoldi et al. |
| 10,366,378 | B1 | 7/2019 | Han et al. |
| 10,460,397 | B2 | 10/2019 | Cowen et al. |
| 10,607,244 | B2 | 3/2020 | Fordyce et al. |
| 10,628,828 | B2 | 4/2020 | Caldera |
| 2006/0293981 | A1 | 12/2006 | Mcnelley et al. |
| 2015/0269580 | A1* | 9/2015 | Subramanian ..... G06Q 20/4016 705/44 |
| 2016/0027051 | A1 | 1/2016 | Gross |
| 2016/0086185 | A1 | 3/2016 | Adjaoute |
| 2016/0140561 | A1 | 5/2016 | Cowan |
| 2017/0076288 | A1 | 3/2017 | Awasthi |
| 2018/0025428 | A1 | 1/2018 | Jain et al. |
| 2018/0240133 | A1 | 8/2018 | Lu et al. |
| 2019/0080327 | A1 | 3/2019 | Zhang et al. |

FOREIGN PATENT DOCUMENTS

| | | |
|---|---|---|
| CN | 106529953 A | 3/2017 |
| CN | 106845999 A | 6/2017 |
| CN | 107274042 A | 10/2017 |
| CN | 107679985 A | 2/2018 |
| CN | 107958341 A | 4/2018 |
| CN | 108053214 A | 5/2018 |
| CN | 108564386 A | 9/2018 |
| CN | 108564467 A | 9/2018 |
| CN | 109118051 A | 1/2019 |
| CN | 109191129 A | 1/2019 |
| CN | 109360089 A | 2/2019 |
| CN | 109461068 A | 3/2019 |
| CN | 109461073 A | 3/2019 |
| CN | 110033170 A | 7/2019 |
| TW | 201828198 A | 8/2018 |

OTHER PUBLICATIONS

International Preliminary Report on Patentability Chapter I for PCT Application No. PCT/CN2020/070672 dated Sep. 23, 2021.

First Search for Chinese Application No. 201910192832.0 dated May 21, 2021.

Search Report for Taiwanese Application No. 108134040 dated Oct. 30, 2020.

Written Opinion of the International Searching Authority and International Search Report for PCT Application No. PCT/CN2020/070672 dated Apr. 9, 2020.

Supplementary Search for Chinese Application No. 201910192832.0 dated Jan. 8, 2022.

* cited by examiner

US 11,379,845 B2

METHOD AND DEVICE FOR IDENTIFYING A RISK MERCHANT

TECHNICAL FIELD

The present application is a continuation application of International Application No. PCT/CN2020/070672, filed with China National Intellectual Property Administration ("CNIPA") on Jan. 7, 2020, and entitled "METHOD AND DEVICE FOR IDENTIFYING A RISK MERCHANT," which is based on and claims priority to and benefits of Chinese Patent Application No. 201910192832.0, filed on Mar. 14, 2019. The entire contents of all of the above-identified applications are incorporated herein by reference.

TECHNICAL FIELD

The present disclosure relates to the field of computer technologies, and in particular, to a method and an apparatus for identifying a risk merchant.

BACKGROUND

With the development of e-commerce technologies, increasingly more transactions are conducted through the Internet. In transaction process conducted over the Internet, an anti-risk team or mechanism generally monitors suspicious transaction behaviors to identify a risky behavior. A suspect or hacker may try all means to evade monitoring of the anti-risk team or mechanism. Therefore, task volumes of monitoring a risky behavior become increasingly large. In addition, due to the rapid and convenient nature of Internet transactions, a number of transaction behaviors that need to be monitored also becomes increasingly large. Therefore, existing technologies urgently require a way to assist the anti-risk team or mechanism in identifying a risk transaction more rapidly and more effectively.

SUMMARY

This specification provides a method and an apparatus for identifying a risk merchant. According to the methods and the apparatuses, a risk merchant can be identified based on a similarity between a merchant cluster marked as risk merchants and merchants to be identified. In this way, a risk merchant can be accurately identified, and a computing burden in the identification process can be reduced, thereby improving identification efficiency.

Embodiments of this specification provide a method for identifying a risk merchant, the method includes: determining, for each of at least one marked merchant cluster based on a user correlation degree of a merchant to be identified and the each marked merchant cluster, a degree of similarity between the merchant to be identified and the marked merchant cluster, wherein each marked merchant in the each marked merchant cluster is with a corresponding risk category by a trained classification model, and the user correlation degree of the merchant to be identified and the marked merchant cluster comprises a user correlation coefficient of the merchant to be identified and the marked merchant cluster and a number of same users of the merchant to be identified and the marked merchant cluster; and determining whether the merchant to be identified is a risk merchant based on the degree of similarity between the merchant to be identified and the each marked merchant cluster.

In some embodiments, the user correlation coefficient comprises a ratio of the same users as the marked merchant cluster in users of the merchant to be identified.

In some embodiments, the user correlation coefficient further comprises a user feature similarity degree between the merchant to be identified and the marked merchant cluster.

In some embodiments, the each marked merchant cluster comprises at least one representative marked merchant, and the determining, a degree of similarity between the merchant to be identified and the marked merchant cluster comprises: determining a degree of similarity between the merchant to be identified and the at least one representative marked merchant based on a vector representation of the merchant to be identified for the marked merchant cluster and a vector representation of the at least one representative marked merchant of the marked merchant cluster; and determining the degree of similarity between the merchant to be identified and the marked merchant cluster based on the degree of similarity between the merchant to be identified and the at least one representative marked merchant.

In some embodiments, the determining a degree of similarity between the merchant to be identified and the marked merchant cluster further comprises: performing a normalization processing on the vector representation of the merchant to be identified.

In some embodiments, the at least one representative marked merchant of the each marked merchant cluster is determined based on a number of users of each marked merchant in the marked merchant cluster.

In some embodiments, the degree of similarity between the merchant to be identified and the at least one representative marked merchant of the each marked merchant cluster is represented by at least one of a Euclidean distance, a Manhattan distance, or an angle cosine distance.

In some embodiments, the determining a corresponding risk category for the merchant to be identified based on the degree similarity between the merchant to be identified and the each marked merchant cluster comprises: sorting at least two degrees of similarity between the merchant to be identified and the each marked merchant cluster; and determining the first predetermined number of merchants to be identified with the greatest degrees of similarity between the merchant to be identified and the each marked merchant cluster as risk merchants of a risk category corresponding to the each marked merchant cluster.

Embodiments of this specification further provide a system comprising one or more processors and one or more non-transitory computer-readable memories coupled to the one or more processors and configured with instructions executable by the one or more processors to cause the system to perform operations comprising: determining, for each of at least one marked merchant cluster based on a user correlation degree of a merchant to be identified and the each marked merchant cluster, a degree of similarity between the merchant to be identified and the marked merchant cluster, wherein each marked merchant in the each marked merchant cluster is marked with a corresponding risk category by a trained classification model, and the user correlation degree of the merchant to be identified and the marked merchant cluster comprises a user correlation coefficient of the merchant to be identified and the marked merchant cluster and a number of same users of the merchant to be identified and the marked merchant cluster; and determining a corresponding risk category for the merchant to be identified is a risk merchant based on the degree of similarity between the merchant to be identified and the each marked merchant cluster.

Embodiments of this specification further provide one or more non-transitory computer-readable storage media storing instructions executable by one or more processors, wherein execution of the instructions causes the one or more processors to perform operations comprising: determining, for each of at least one marked merchant cluster based on a user correlation degree of a merchant to be identified and the each marked merchant cluster, a degree of similarity between the merchant to be identified and the marked merchant cluster, wherein each marked merchant in the each marked merchant cluster is marked with a corresponding risk category by a trained classification model, and the user correlation degree of the merchant to be identified and the marked merchant cluster comprises a user correlation coefficient of the merchant to be identified and the marked merchant cluster and a number of same users of the merchant to be identified and the marked merchant cluster; and determining a corresponding risk category for the merchant to be identified based on the degree of similarity between the merchant to be identified and the each marked merchant cluster.

BRIEF DESCRIPTION OF THE DRAWINGS

To describe the technical solutions in the embodiments of this specification or in the existing technologies more clearly, the following briefly describes the accompanying drawings required for describing the embodiments or the existing technologies. Apparently, the accompanying drawings in the following description show merely some of the embodiments of this specification, and a person of ordinary skill in the art may still derive other drawings from the accompanying drawings.

DETAILED DESCRIPTION

The following describes details of embodiments of this specification with reference to the accompanying drawings. The accompanying drawings show some embodiments of this specification, and this specification may be implemented in various manners and is not limited by the embodiments described herein. Rather, these embodiments are provided, so that this specification is more thoroughly understood and the scope of this specification is completely conveyed to a person skilled in the art.

Figure 1:
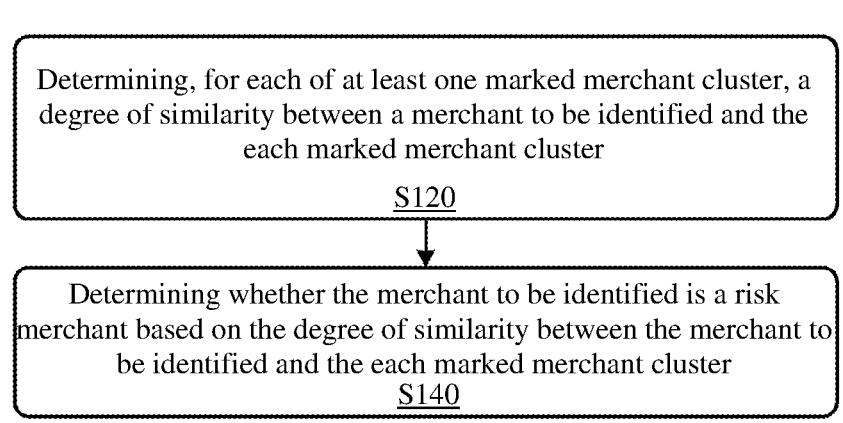
FIG. 1 is a flowchart of an example method for identifying a risk merchant, according to some embodiments of this specification.

FIG. 1 is a flowchart of an example method for identifying a risk merchant, according to some embodiments of this specification.

As shown in FIG. 1, in step S120, for each of at least one marked merchant cluster, a degree of similarity between a merchant to be identified and the each marked merchant cluster is determined. In some embodiments, the merchant to be identified refers to a merchant that is to be determined if it is a risk merchant or whether it belongs to a risk category. In some embodiments, the degree of similarity can be determined based on a user correlation degree value for the merchant to be identified and the marked merchant cluster. In some embodiments, each merchant in the one or more marked merchant clusters is marked as a risk merchant of a corresponding risk category. The risk merchant refers to a merchant at a risk of conducting an abnormal transaction. For example, an abnormal transaction can be an illegal transaction such as a money-laundering criminal transaction.

In some embodiments, risk merchants may be manually labelled, and the risk merchants labelled in a same category can be merged into the same marked merchant cluster. In some embodiments, risk merchants may be clustered into the one or more marked merchant clusters using a trained classification model. The classification model may be trained by using collected user data on merchants. In some embodiments, risk categories corresponding to each of the one or more marked merchant clusters may be categories such as a drug risk, a smuggle risk, a gamble risk, or a fraud risk. In some embodiments, after obtaining the each marked merchant cluster, a user group of each marked merchant in the marked merchant cluster may be merged into a user group of the marked merchant cluster. Therefore, user features of the each marked merchant can be integrated into user features of the marked merchant cluster. In some embodiments, users of each merchant may be determined based on one or more financial relationships between the users and the merchant.

In some embodiments, when risk merchants of the same category are merged to obtain a marked merchant cluster, a merchant may be identified as a risk merchant by determining a degree of similarity between the merchant and the one or more marked merchant clusters without calculating or determining a degree of similarity between the merchant and each marked merchant one by one. As a result, a computing amount associated with identifying the risk merchant can be greatly reduced, and a computing efficiency associated with identifying the risk merchant can be improved. In some embodiments, the degree of similarity can be calculated or determined based on the user group generated by merging the user group of each marked merchant in the marked merchant cluster, so that features of the each marked merchant cluster can be enriched, thereby improving the accuracy of identifying a risk merchant.

In some embodiments, the user correlation degree value of the merchant to be identified and the marked merchant cluster may include a user correlation coefficient of the merchant to be identified and the marked merchant cluster and a number of same users shared by the merchant to be identified and the marked merchant cluster. In some embodiments, the user correlation coefficient may be a ratio of the same users as the marked merchant cluster in users of the merchant to be identified. That is, the user correlation coefficient may be calculated or determined using an expression 1 shown below.

$$M(A, G) = \frac{|A \cap G|}{|A|}$$

In the expression 1, A represents the number of users of the merchant to be identified, and G represents the number of users of the marked merchant cluster. M(A, G) can represent the user correlation coefficient of the merchant to be identified and the marked merchant cluster. In expression 1, A∩G can indicate the number of same users in the merchant to be identified and the marked merchant cluster. In some embodiments, for expression 1 when a value of A is 0, the value of M(A, G) is set to 0.

In some embodiments, the user correlation coefficient may further include a user feature similarity degree between the merchant to be identified and the each marked merchant cluster. For example, the user feature similarity degree between the merchant to be identified and the each marked merchant cluster may be determined based on user data of the merchant to be identified using a trained classification model. In some embodiments, the user feature similarity degree can be used to further determine the degree of similarity between the merchant to be identified and the each marked merchant cluster. In some embodiments, user features may be further extracted from user data (e.g., user basic information and user behavior data) of the merchant to be identified and the marked merchant cluster using a feature extraction model (e.g., a logistic regression model). In some embodiments, the extracted user features can be used to further determine the user feature similarity degree between the merchant to be identified and the each marked merchant cluster.

In some embodiments, the user correlation coefficient may be determined as a relative user correlation degree value of the merchant to be identified and the marked merchant cluster, and the number of same users may be considered as an absolute user correlation degree value of the merchant to be identified and the marked merchant cluster. Therefore, the degree of similarity may be determined based on the relative user correlation degree value and the absolute user correlation degree value.

Referring back to FIG. 1, in some embodiments, after the degree of similarity between the merchant to be identified and the each marked merchant cluster is determined, in Step S140, it is determined whether the merchant to be identified is a risk merchant based on the degree of similarity.

In some embodiments, the merchant to be identified can have a risk coefficient. In some embodiments, the risk coefficient can be determined according to the values of the degrees of similarity between the merchant to be identified and one or more marked merchant clusters. For example, the risk coefficient can be determined as a largest value among the degrees of similarity between the merchant to be identified and the one or more marked merchant clusters. In some embodiments, the risk coefficient can be used to determine whether the merchant to be identified is a risk merchant. In some embodiments, the risk coefficient can be used together with a predetermined risk threshold to determine whether the merchant to be identified is a risk merchant. For example, it may be set that the merchant to be identified is determined as a risk merchant when the risk coefficient of the merchant to be identified is greater than the predetermined risk threshold.

In some embodiments, each marked merchant cluster may include at least one representative marked merchant. The representative marked merchant may be determined based on the number of users of each marked merchant in the marked merchant cluster. For example, the marked merchants in the each marked merchant cluster may be sorted based on the number of users corresponding to each of the marked merchants. The representative marked merchant may be, for example, a marked merchant whose number of users is a median in a sorted result, or may be two or more marked merchants in the middle of the sorted result. In some embodiments, the representative marked merchant may be two or more marked merchants apart from each other by a predetermined number of sequence numbers in the sorted result. For example, assuming that there are 300 marked merchants in a marked merchant cluster, after sorting, the 300 marked merchants can have sequence numbers ranging from 1-300. One or more representative marked merchants may be selected every 50 sequence numbers (e.g., marked merchants with sequence numbers of 50, 100, 150, 200, 250, and 300). In some embodiments, when the each marked merchant cluster includes a representative marked merchant, a degree of similarity between the merchant to be identified and the representative marked merchant may be determined and used to determine the degree of similarity between the merchant to be identified and the corresponding marked merchant cluster.

Figure 2:
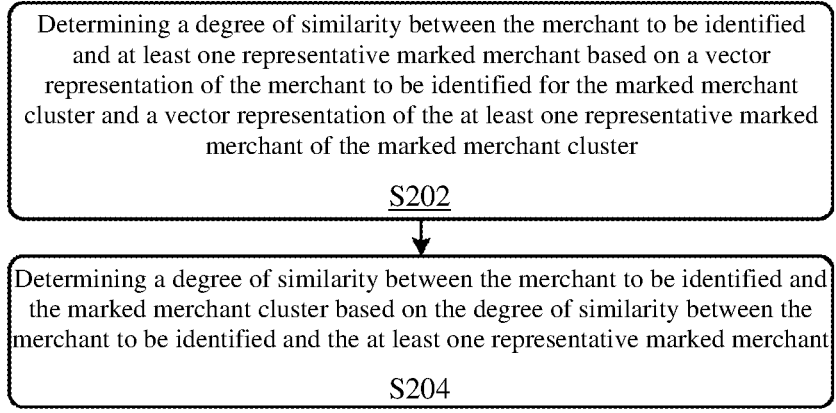
FIG. 2 is a flowchart of an example similarity determining process for identifying a risk merchant, according to some embodiments of this specification.

FIG. 2 is a flowchart of an example similarity determining process for identifying a risk merchant, according to some embodiments of this specification.

As shown in FIG. 2, in step S202, a degree of similarity between the merchant to be identified and the at least one representative marked merchant is determined. In some embodiments, the similarity is determined based on a vector representation of the merchant to be identified for the marked merchant cluster and a vector representation of the at least one representative marked merchant of the marked merchant cluster. In some embodiments, a vector representation of a merchant for a marked merchant cluster can be established based on a user correlation coefficient between the merchant to be identified and the marked merchant cluster and a number of same users between the merchant to be identified and the marked merchant cluster.

In some embodiments, the degree of similarity between the merchant to be identified and the representative marked merchant may be represented by, for example, a Euclidean distance, a Manhattan distance, or an angle cosine distance. An example of a determining process for the degree of similarity between the merchant to be identified and the representative marked merchant is described below using an example of the Euclidean distance. For example, a user correlation coefficient of the merchant to be identified or the representative marked merchant and the marked merchant cluster can be a ratio of the same users as the marked merchant cluster in users of the merchant to be identified or the representative marked merchant.

In some embodiments, for a marked merchant cluster, a vector representation of the merchant to be identified may be (M(A, G), |A∩G|), where A represents users in the merchant to be identified, G represents users in the marked merchant cluster, M (A, G) represents a user correlation coefficient between the merchant to be identified and the marked merchant cluster, and |A∩G| represents the number of same users between the merchant to be identified and the marked merchant cluster. A vector representation of the representative marked merchant of the marked merchant cluster may be (M($G_p$, G), |$G_p$∩G|), where $G_p$ represents users of the representative marked merchant. Since users of the representative marked merchant all come from the marked merchant cluster, a value of a user correlation coefficient M($G_p$, G) between the representative marked merchant and the marked merchant cluster is 1. Moreover, $|G_p \cap G|$ which represents the number of same users between the representative marked merchant and the marked merchant cluster is $G_p$. The degree of similarity between the merchant to be identified and the representative marked merchant may be determined by using an expression 2 shown below.

$$D(A, G_p) = \sqrt{(M(A,G)-1)^2 + (|A \cap G| - |G_p|)^2}$$

In the expression 2, $G_p$ represents the users of the representative marked merchant, and $D(A, G_p)$ is a Euclidean distance between the merchant to be identified and the representative marked merchant.

In step S204 of FIG. 2, the degree of similarity between the merchant to be identified and the marked merchant cluster is determined based on the similarity between the merchant to be identified and the at least one representative marked merchant.

In some embodiments, a value of the user correlation coefficient in the vector representation may be relatively small (e.g., a value range of [0, 1]). When the number of same users between the merchant to be identified and a marked merchant cluster is relatively large (e.g., larger than 1), the number of the same users in the vector representation can be far greater than the user correlation coefficient. As a result, the user correlation coefficient may be overshadowed by the number of the same users and the user correlation coefficient may not be able to play a meaningful role in determining the degree of similarity (e.g., see Expression 2). Therefore, a determined degree of similarity may not be accurate enough. In some embodiments, before the step S202 is performed, the number of the same users and the user correlation coefficient in the vector representation may be adjusted into a same value range. For example, if the user correlation coefficient is in a range of [0, 1], the number of the same users can also be adjusted to the same range of [0, 1]. The steps S202 and S204 can then be performed based on the adjusted vector representation.

In some embodiments, normalization processing may be performed on the number of the same users in the vector representation. For example, normalization processing may be performed on the number of the same users using an expression 3 shown below.

$$f(x) = \frac{\max(x, |G_p|)}{|G_p|}$$

As shown in the expression 3, normalization function $f(x)$ can be applied on A, which represents the users in the merchant to be identified. Based on the expression 3, The vector representation of the merchant to be identified after the normalization processing can be represented as $$\left(M(A, G), \frac{\max(|A \cap G|, |G_p|)}{|G_p|}\right),$$

and the vector representation of the representative marked merchant can be (1, 1). The similarity between the merchant to be identified and the representative marked merchant may be modified to an expression 4 shown below.

$$D(A, G_p) = \sqrt{(M(A, G) - 1)^2 + \left(\frac{\max(|A \cap G|, |G_p|)}{|G_p|} - 1\right)^2}$$

As shown in the expression 4, in some embodiments, a value range of $D(A, G_p)$ is $[0, \sqrt{2}]$. In some embodiments, a calculation or determination formula of the degree of similarity may be further modified based on the expression 4. For example, a degree of similarity may be determined based on an expression 5 shown below.

$$S(A, G_p) = 1 - \frac{D(A, G_p)}{\sqrt{2}}$$

In the expression 5, $S(A, G_p)$ represents a degree of similarity between the merchant to be identified and the representative marked merchant. The degree of similarity can have a value range of [0, 1].

Although a method of performing normalization processing using the expression 3 is shown above, it is appreciated that the normalization processing may be performed in other manners. For example, the number of same users in each vector representation may be divided by a largest value of the number of the same users in all vector representations to perform normalization processing.

In some embodiments, after the degree of similarity between the merchant to be identified and the representative marked merchant is determined, the degree of similarity between the merchant to be identified and the marked merchant cluster may be determined. For example, the degree of similarity between the merchant to be identified and the representative marked merchant may be determined as the degree of similarity between the merchant to be identified and the marked merchant cluster. In some embodiments, the marked merchant cluster may include two or more representative marked merchants. In this case, an average of the degrees of similarity between the merchant to be identified and the representative marked merchants may be determined, and the determined average can be used as the degree of similarity between the merchant to be identified and the marked merchant cluster. In some embodiments, the representative marked merchants are a plurality of marked merchants selected based on sorting of the marked merchants in the marked merchant cluster. In this case, the numbers of the users of the representative marked merchants may be assigned different weights, and a weighted average value or a weighted sum of the degrees of similarity between the merchant to be identified and the representative marked merchants is determined, and the determined weighted average value or the weighted sum can be used as the degree of similarity between the merchant to be identified and the marked merchant cluster.

Figure 3:
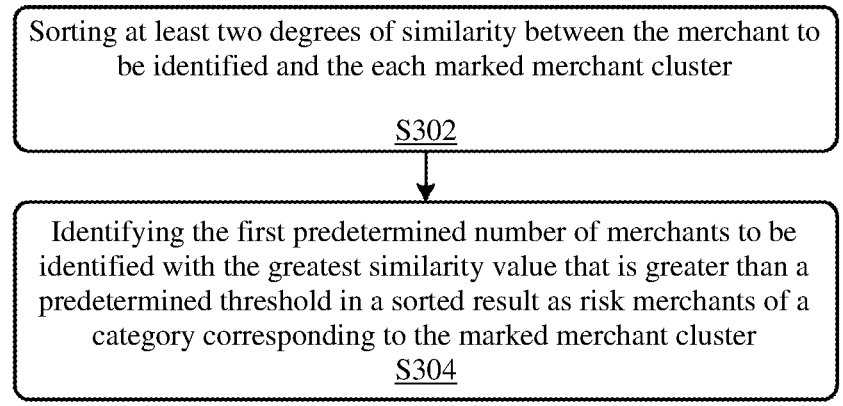
FIG. 3 is a flowchart of an example risk merchant identification process for identifying a risk merchant with two or more merchants to be identified, according to some embodiments of this specification.

In some embodiments, when the degree of similarities between the merchant to be identified and the plurality of marked merchant clusters are determined, for each of the marked merchant clusters, the first predetermined number of merchants to be identified with the greatest degree of similarity that is greater than a predetermined threshold between the merchant to be identified and the marked merchant cluster may be identified as risk merchants of a category corresponding to the marked merchant cluster. FIG. 3 is a flowchart of an example risk merchant identification process for identifying a risk merchant with two or more merchants to be identified, according to some embodiments of this specification.

As shown in FIG. 3, in step S302, at least two degrees of similarity between the merchant to be identified and the each marked merchant cluster are sorted.

In step S304, the first predetermined number of merchants to be identified with the greatest degrees of similarity in a sorted result are identified as risk merchants of a category corresponding to the marked merchant cluster. In some embodiments, the first predetermined number of merchants to be identified have degrees of similarity that are greater than a predetermined threshold.

In some embodiments, a largest value in the degrees of similarity between the merchant to be identified and the each marked merchant cluster may be further determined as a risk coefficient of the merchant to be identified. In some embodiments, a predetermined number of merchants to be identified with the greatest value in risk coefficients can be determined as risk merchants. In some embodiments, a predetermined number of merchants to be identified with risk coefficients that are greater than a predetermined threshold can be determined as risk merchants.

In some embodiments, after the risk merchants are determined, verification processing may be further performed on the determined risk merchants to exclude merchants with a relatively lower risk. For example, data of the determined risk merchants may be sent to an anti-risk monitoring team or mechanism, and these merchants can be analyzed further by professionals in the monitoring team or the mechanism to exclude any determined risk merchant with a relatively lower risk.

Figure 4:
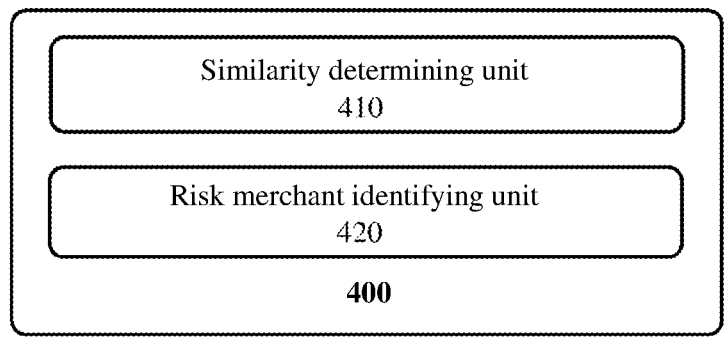
FIG. 4 is a schematic of an example apparatus for identifying a risk merchant, according to some embodiments of this specification.

FIG. 4 is a schematic of an example apparatus for identifying a risk merchant, according to some embodiments of this specification. As shown in FIG. 4, an apparatus 400 for identifying a risk merchant can include a similarity determining unit 410 and a risk merchant identifying unit 420. In some embodiments, the similarity determining unit 410 and the risk merchant identifying unit 420 include software modules that can be executed by a processor to implement the risk identification functionalities.

In some embodiments, the similarity determining unit 410 is configured to determine, for each of at least one marked merchant cluster, a degree of similarity between at least one merchant to be identified and the each marked merchant cluster. In some embodiments, the degree of similarity is determined based on a user correlation degree value of the merchant to be identified and the marked merchant cluster. In some embodiments, each marked merchant in the each marked merchant cluster can be marked with a corresponding risk category.

In some embodiments, the risk merchant identifying unit 420 is configured to identify a risk merchant in the at least one merchant to be identified. In some embodiments, the risk merchant is identified based on the degree of similarity between the at least one merchant to be identified and the each marked merchant cluster.

In some embodiments, the risk merchant identifying unit 420 can be configured to identify the first predetermined number of merchants to be identified with the greatest degrees of similarity in at least two degrees of similarities between the merchant to be identified and the marked merchant cluster as risk merchants of a category corresponding to the marked merchant cluster. In some embodiments, the greatest degrees of similarity are greater than a predetermined threshold.

In some embodiments, the user correlation degree value of the merchant to be identified and the marked merchant cluster may include a user correlation coefficient of the merchant to be identified and the marked merchant cluster and a number of same users of the merchant to be identified and the marked merchant cluster. In some embodiments, the user correlation coefficient may be a ratio of the same users as the marked merchant cluster in users of the merchant to be identified. In some embodiments, the user correlation coefficient may further include a feature similarity between the users of the merchant to be identified and users of the marked merchant cluster.

Figure 5:
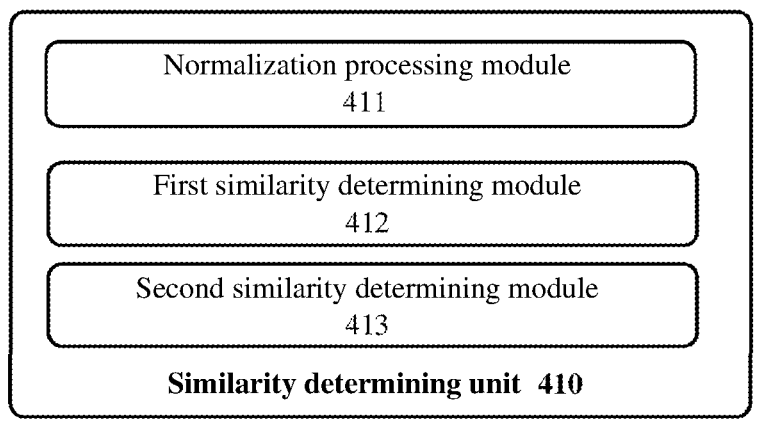
FIG. 5 is a schematic of an example similarity determining unit for identifying a risk merchant, according to some embodiments of this specification.

FIG. 5 is a schematic of an example similarity determining unit for identifying a risk merchant, according to some embodiments of this specification. In this example, each marked merchant cluster may include at least one representative marked merchant. As shown in FIG. 5, a similarity determining unit 410 may include a normalization processing module 411, a first similarity determining module 412, and a second similarity determining module 413. In some embodiments, the normalization processing module 411, the first similarity determining module 412, and the second similarity determining module 413 can include software modules that can be executed by a processor to implement the risk identification functionalities. In some embodiments, the normalization processing module 411 may not be included in the similarity determining unit 410.

The first similarity determining module 412 is configured to determine a degree of similarity between the merchant to be identified and the at least one representative marked merchant. In some embodiments, the degree of similarity is determined based on a vector representation of the merchant to be identified for the marked merchant cluster and a vector representation of the at least one representative marked merchant of the marked merchant cluster.

The second similarity determining module 413 is configured to determine a degree of similarity between the merchant to be identified and the marked merchant cluster based on the degree of similarity between the merchant to be identified and the at least one representative marked merchant. In some embodiments, a vector representation of a merchant for the marked merchant cluster is a vector representation based on a user correlation coefficient of the merchant and the marked merchant cluster and a number of same users of the merchant and the marked merchant cluster.

In some embodiments, to reduce or avoid inaccuracy in a determined degree of similarity caused by an excessively large difference between value ranges of different dimensions in the vector representation, dimensions of the number of same users and dimensions of the user correlation coefficient in the vector representation may be processed into a same or similar value range using the normalization processing module 411. In some embodiments, the dimensions may be processed before the degree of similarity between the merchant to be identified and the marked merchant cluster is determined based on a user correlation degree value of the merchant to be identified in at least one merchant to be identified and the marked merchant cluster. In some embodiments, the normalization processing can be similar to the normalization processing described in FIG. 2.

The methods and the apparatuses for identifying a risk merchant are described above with reference to FIG. 1 to FIG. 5. It is appreciated that details mentioned in the description of the method for identifying a risk merchant are also applicable to the apparatus for identifying a risk merchant. The embodiments in this specification are described in a progressive manner, and same or similar parts among the embodiments may be mutually referenced.

In some embodiments, the apparatus for identifying a risk merchant of the present disclosure may be implemented by hardware, or software, or a combination of hardware and software. Taking software implementation as an example, an apparatus in a logical aspect can be formed by a processor of the device in which the apparatus resides reading corresponding computer program instructions in a non-volatile storage into a memory for running.

Figure 6:
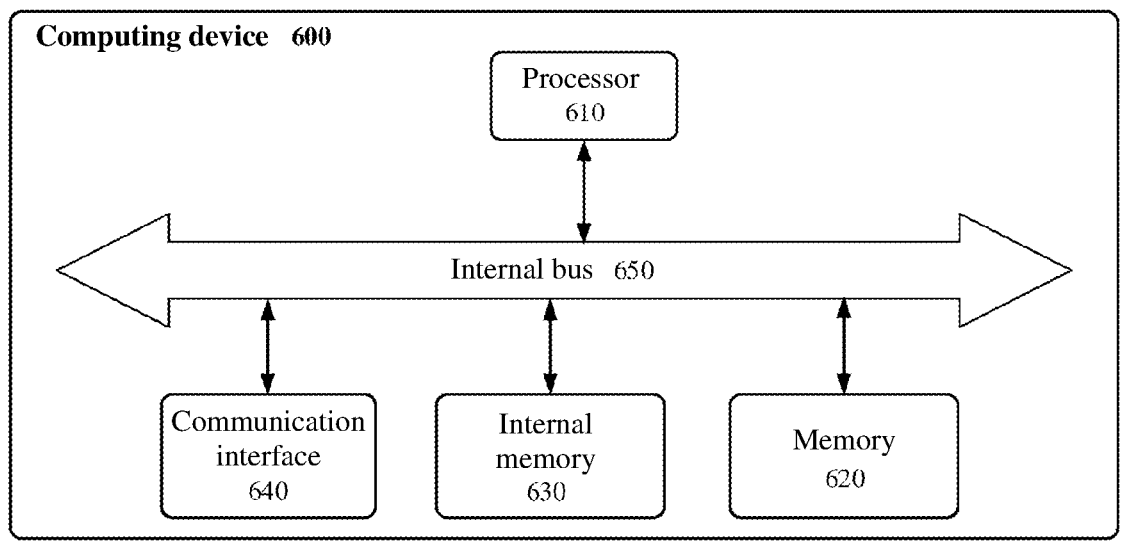
FIG. 6 is a schematic of an example computing device for identifying a risk merchant, according to some embodiments of this specification.

FIG. 6 is a schematic of a computing device for identifying a risk merchant, according to some embodiments of this specification. As shown in FIG. 6, the computing device 600 may include at least one processor 610, a memory 620, an internal memory 630, a communication interface 640, and an internal bus 650. In some embodiments, the at least one processor 610 can execute at least one computer-readable instruction (e.g., the above-described element implemented in the form of software) stored or encoded in a computer-readable storage medium (e.g., the memory 620).

The at least one processor 610 may be implemented in a manner of a general central processing unit (CPU), a microprocessor, an application-specific integrated circuit (ASIC), or one or more integrated circuits, and is configured to execute a related program to implement the technical solutions provided in the embodiments of this specification.

The memory 620 may be implemented in a form of a read-only memory (ROM), a random access memory (RAM), a static storage device, or a dynamic storage device. The memory 620 may store an operating system and another application program. When the technical solutions provided in the embodiments of this specification are implemented by means of software or firmware, related program code is stored in the memory 620 and is executed by the at least one processor 610.

The communication interface 640 is configured to connect to a communication module (not shown in the figure), to implement communication interaction between the device and another device. The communication module may implement communication in a wired manner (such as a USB and a network cable), or may implement communication in a wireless manner (such as a mobile network, WiFi, and Bluetooth).

The bus 650 can include a path, for transmitting information between the components (for example, the processor 610, the memory 620, the internal memory 630, and the communication interface 640) of the device.

In some embodiments, although the computing device 600 shows only the at least one processor 610, the memory 620, the internal memory 630, the communication interface 640, and the bus 650, in a specific implementation process, the device may further include other components required by normal running. For example, the computing device 600 can further include an input/output interface. In addition, a person skilled in the art may understand that the device may alternatively include only components necessary for implementing the solution of the embodiments of this specification and not necessarily include all components shown in the figure.

In some embodiments, the computing device 600 may include a personal computer, a server computer, a workstation, a desktop computer, a laptop computer, a notebook computer, a mobile computing device, a smart phone, a tablet computer, a cellular phone, a personal digital assistant (PDA), a handheld apparatus, a messaging device, a wearable computing device, a consumer electronic device, and the like.

In some embodiments, a computer-readable storage medium storing a computer program is provided. The program, when executed by a process, can implement any of the previously described methods.

In some embodiments, the computer-readable medium includes a persistent medium and a non-persistent medium, a removable medium and a non-removable medium, which may implement storage of information by using any method or technology. The information may be a computer-readable instruction, a data structure, a module of a program, or other data. Examples of computer storage media include, but are not limited to, a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer readable medium does not include transitory computer readable media (transitory media), such as a modulated data signal and a carrier. In some embodiments, the computer-readable storage medium can be a part of the memory 620 shown in FIG. 6, and the computer program stored in the computer-readable storage medium can be executed by the process 610 shown in FIG. 6. It is appreciated that the computer-executable instructions stored in the memory 620, when executed, can cause the at least one processor 610 to perform the various operations and functions described above with reference to FIG. 1 to FIG. 5.

According to the methods and the apparatuses for identifying a risk merchant of this specification, a degree of similarity between a merchant to be identified and a marked risk merchant cluster can be determined based on a user correlation degree value of the merchant to be identified and the marked merchant cluster, and a risk merchant in the merchant to be identified can be further identified based on the degree of similarity, so that identification can be comprehensively performed based on features of a plurality of marked merchants in the marked merchant cluster. In this way, a risk merchant can be accurately identified, and an amount of computation required in an identification process is relatively small, thereby further improving identification efficiency.

According to the methods and the apparatuses for identifying a risk merchant of this specification, the degree of similarity between the merchant to be identified and the marked merchant cluster can be determined based on a user correlation coefficient of the merchant to be identified and the marked merchant cluster and the number of same users of the merchant to be identified and the marked merchant cluster, so that the degree of similarity between the merchant to be identified and the marked merchant cluster can be determined based on a relative correlation attribute and an absolute correlation attribute of the merchant to be identified and the marked merchant cluster, thereby improving the accuracy of risk identification.

According to the methods and the apparatuses for identifying a risk merchant of this specification, each marked merchant cluster may be represented by a representative marked merchant, and the degree of similarity between the merchant to be identified and the each marked merchant cluster can be determined based on vector representations of the merchant to be identified and the representative marked merchant of the each marked merchant cluster, so that complexity in identifying a risk merchant can be reduced, thereby further improving identification efficiency.

According to the methods and the apparatuses for identifying a risk merchant of this specification, before the degree of similarity between the representative marked merchant and the merchant to be identified can be determined, dimensions of the number of same users and dimensions of the user correlation coefficient in the vector representation may be processed into a same or similar value range, so that a feature of one dimension may be prevented from being omitted due to a difference between value ranges, thereby further improving the accuracy of identifying a risk merchant.

According to the methods and the apparatuses for identifying a risk merchant of this specification, the representative marked merchant of the each marked merchant cluster can be determined based on the number of users of each marked merchant in the each marked merchant cluster, so that the representative marked merchant of the marked merchant cluster can be selected according to an actual situation, thereby improving the flexibility of the identification process.

In some embodiments, a computer-readable storage medium storing a computer program is provided. The program, when executed by a process, can implement any of the previously described methods.

In some embodiments, the computer-readable medium includes a volatile medium and a non-volatile medium, a removable medium and a non-removable medium, which may implement storage of information by using any method or technology. The information may be a computer-readable instruction, a data structure, a module of a program, or other data. Examples of computer storage media include, but are not limited to, a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer readable medium does not include transitory computer readable media (transitory media), such as a modulated data signal and a carrier. In some embodiments, the computer-readable storage medium can be a part of the memory 620 shown in FIG. 6, and the computer program stored in the computer-readable storage medium can be executed by the process 610 shown in FIG. 6.

It may be learned from description of the foregoing implementations that, a person skilled in the art may clearly understand that the embodiments of this specification may be implemented by using software in addition to a necessary universal hardware platform. Based on such an understanding, the technical solutions of the embodiments of this specification essentially or the part contributing to the existing technologies may be implemented in a form of a software product. The computer software product may be stored in a storage medium, such as a ROM/RAM, a hard disk, or an optical disc, and includes a plurality of instructions for instructing a computer device (which may be a personal computer, a server, or a network device) to perform the methods described in the embodiments or some parts of the embodiments of this specification.

The system, the method, the module or the unit described in the foregoing embodiments may be implemented by a computer chip or an entity, or implemented by a product having a certain function. A typical implementation device is a computer, and the specific form of the computer may be a personal computer, a laptop computer, a cellular telephone, a camera phone, a smartphone, a personal digital assistant, a media player, a navigation device, an email transceiver device, a game console, a tablet computer, a wearable device, or a combination thereof.

In this specification, the embodiments are described in a progressive manner Reference may be made to each other for the same or a similar part of the embodiments. Each embodiment focuses on a difference from other embodiments. Especially, apparatus and device embodiments are basically similar to a method embodiment, and therefore are described briefly; for related parts, refer to partial descriptions in the method embodiment. The method embodiment described above is merely an example. The modules described as separate parts may or may not be physically separate. During implementation of the solutions of the embodiments of this specification, the function of the modules may be implemented in the same piece of or a plurality of pieces of software and/or hardware. A part or all of the modules may be selected according to actual needs to achieve the objectives of the solutions of the embodiments. A person of ordinary skill in the art may understand and implement this specification without creative efforts.

The foregoing descriptions are merely specific implementations of the embodiments of this specification. A person of ordinary skill in the art may make several improvements and modifications without departing from the principle of the embodiments of this specification and the improvements and modifications shall fall within the protection scope of the embodiments of this specification.

What is claimed is:

1. A method for identifying a risk merchant, comprising:
collecting, by a processor, user data of a plurality of merchants;
training, by the processor, a classification model using the user data of the plurality of merchants, wherein the classification model is used to mark each merchant in at least one merchant cluster with a corresponding risk category;
determining, by the processor, for each of the at least one marked merchant cluster, a degree of similarity between a merchant to be identified and the each marked merchant cluster based on a user correlation degree of the merchant to be identified and the each marked merchant cluster, wherein:
the user correlation degree of the merchant to be identified and the each marked merchant cluster comprises a user correlation coefficient of the merchant to be identified and the each marked merchant cluster and a number of same users of the merchant to be identified and the each marked merchant cluster; and
determining, by the processor, a corresponding risk category for the merchant to be identified based on the degree of similarity between the merchant to be identified and the each marked merchant cluster.

2. The method according to claim 1, wherein the user correlation coefficient comprises a ratio of the same users as the each marked merchant cluster in users of the merchant to be identified.

3. The method according to claim 2, wherein the user correlation coefficient further comprises a user feature similarity degree between the merchant to be identified and the each marked merchant cluster.

4. The method according to claim 1, wherein the each marked merchant cluster comprises at least one representative marked merchant, and the determining, a degree of similarity between the merchant to be identified and the each marked merchant cluster comprises:
  determining a degree of similarity between the merchant to be identified and the at least one representative marked merchant based on a vector representation of the merchant to be identified for the each marked merchant cluster and a vector representation of the at least one representative marked merchant of the each marked merchant cluster; and
  determining the degree of similarity between the merchant to be identified and the each marked merchant cluster based on the degree of similarity between the merchant to be identified and the at least one representative marked merchant.

5. The method according to claim 4, wherein the determining a degree of similarity between the merchant to be identified and the each marked merchant cluster further comprises:
  performing a normalization processing on the vector representation of the merchant to be identified.

6. The method according to claim 4, wherein the at least one representative marked merchant of the each marked merchant cluster is determined based on a number of users of each marked merchant in the each marked merchant cluster.

7. The method according to claim 4, wherein the degree of similarity between the merchant to be identified and the at least one representative marked merchant of the each marked merchant cluster is represented by at least one of a Euclidean distance, a Manhattan distance, or an angle cosine distance.

8. The method according to claim 1, wherein the determining a corresponding risk category for the merchant to be identified based on the degree similarity between the merchant to be identified and the each marked merchant cluster comprises:
  sorting at least two degrees of similarity between the merchant to be identified and the each marked merchant cluster; and
  determining the first predetermined number of merchants to be identified with the greatest degrees of similarity between the merchant to be identified and the each marked merchant cluster as risk merchants of a risk category corresponding to the each marked merchant cluster.

9. A system comprising one or more processors and one or more non-transitory computer-readable memories coupled to the one or more processors and configured with instructions executable by the one or more processors to cause the system to perform operations comprising:
  collecting user data of a plurality of merchants;
  training a classification model using the user data of the plurality of merchants, wherein the classification model is used to mark each merchant in at least one merchant cluster with a corresponding risk category;
  determining, for each of the at least one marked merchant cluster based on a user correlation degree of a merchant to be identified and the each marked merchant cluster, a degree of similarity between the merchant to be identified and the each marked merchant cluster, wherein:
  the user correlation degree of the merchant to be identified and the each marked merchant cluster is based on a user correlation coefficient of the merchant to be identified and the each marked merchant cluster and a number of same users of the merchant to be identified and the each marked merchant cluster; and
  determining a corresponding risk category for the merchant to be identified based on the degree of similarity between the merchant to be identified and the each marked merchant cluster.

10. The system according to claim 9, wherein the user correlation coefficient comprises a ratio of the same users as the each marked merchant cluster in users of the merchant to be identified.

11. The system according to claim 10, wherein the user correlation coefficient further comprises a user feature similarity degree between the merchant to be identified and the each marked merchant cluster.

12. The system according to claim 9, wherein the each marked merchant cluster comprises at least one representative marked merchant, and the operations further comprise:
  determining a degree of similarity between the merchant to be identified and the at least one representative marked merchant based on a vector representation of the merchant to be identified for the each marked merchant cluster and a vector representation of the at least one representative marked merchant of the each marked merchant cluster; and
  determining the degree of similarity between the merchant to be identified and the each marked merchant cluster based on the degree of similarity between the merchant to be identified and the at least one representative marked merchant.

13. The system according to claim 12, wherein the operations further comprise:
  performing a normalization processing on the vector representation of the merchant to be identified.

14. The system according to claim 12, wherein the at least one representative marked merchant of the each marked merchant cluster is determined based on a number of users of each marked merchant in the each marked merchant cluster.

15. The system according to claim 12, wherein the degree of similarity between the merchant to be identified and the at least one representative marked merchant of the each marked merchant cluster is represented by at least one of a Euclidean distance, a Manhattan distance, or an angle cosine distance.

16. The system according to claim 9, wherein the operations further comprise:
  sorting at least two degrees of similarity between the merchant to be identified and the each marked merchant cluster; and
  determining the first predetermined number of merchants to be identified with the greatest degrees of similarity between the merchant to be identified and the each marked merchant cluster as risk merchants of a risk category corresponding to the each marked merchant cluster.

17. One or more non-transitory computer-readable storage media storing instructions executable by one or more processors, wherein execution of the instructions causes the one or more processors to perform operations comprising:
  collecting user data of a plurality of merchants;
  training a classification model using the user data of the plurality of merchants, wherein the classification model is used to mark each merchant in at least one merchant cluster with a corresponding risk category;
  determining, for each of the at least one marked merchant cluster based on a user correlation degree of a merchant to be identified and the each marked merchant cluster, a degree of similarity between the merchant to be identified and the each marked merchant cluster, wherein:

the user correlation degree of the merchant to be identified and the each marked merchant cluster is based on a user correlation coefficient of the merchant to be identified and the each marked merchant cluster and a number of same users of the merchant to be identified and the each marked merchant cluster; and determining a corresponding risk category for the merchant to be identified based on the degree of similarity between the merchant to be identified and the each marked merchant cluster.

18. The one or more non-transitory computer-readable storage media according to claim 17, wherein the user correlation coefficient comprises a ratio of the same users as the each marked merchant cluster in users of the merchant to be identified.

19. The one or more non-transitory computer-readable storage media according to claim 17, wherein the operations further comprise:

determining a degree of similarity between the merchant to be identified and the at least one representative marked merchant based on a vector representation of the merchant to be identified for the each marked merchant cluster and a vector representation of the at least one representative marked merchant of the each marked merchant cluster; and determining the degree of similarity between the merchant to be identified and the each marked merchant cluster based on the degree of similarity between the merchant to be identified and the at least one representative marked merchant.

20. The one or more non-transitory computer-readable storage media according to claim 17, wherein the operations further comprise:

sorting at least two degrees of similarity between the merchant to be identified and the each marked merchant cluster; and determining the first predetermined number of merchants to be identified with the greatest degrees of similarity between the merchant to be identified and the each marked merchant cluster as risk merchants of a risk category corresponding to the each marked merchant cluster.

* * * * *